United States Patent [19]

Ulisch

[11] 3,949,029
[45] Apr. 6, 1976

[54] PRODUCTION OF POROUS SHAPED INORGANIC STRUCTURES USING GAS-LADEN MOLECULAR SIEVE ZEOLITES

[75] Inventor: Gunter Ulisch, Leverkusen-Kuppersteg, Germany

[73] Assignee: Bayer Aktiengesellschaft, Leverkusen, Germany

[22] Filed: June 24, 1974

[21] Appl. No.: 482,129

[30] Foreign Application Priority Data
July 5, 1973  Germany............................ 2334224

[52] U.S. Cl.................... 264/42; 106/40 R; 106/86; 106/110; 264/51; 264/333; 264/DIG. 5
[51] Int. Cl.².................... C04B 11/00; B29H 7/20
[58] Field of Search.......... 106/110, 40 R, 40 V, 86, 106/87, 88, 109; 264/42, 333

[56] References Cited
UNITED STATES PATENTS
3,140,253    7/1964    Plank et al.......................... 208/120

*Primary Examiner*—Patrick P. Garvin
*Assistant Examiner*—John P. Sheehan
*Attorney, Agent, or Firm*—Burgess, Dinklage & Sprung

[57] ABSTRACT

In the production of a porous shaped inorganic structure wherein an inorganic solids-containing suspension is mixed with a gas-generating compound and the suspension is poured into a mold, the improvement which comprises employing as said gas-generating compound a molecular sieve zeolite laden with a gas.

4 Claims, No Drawings

PRODUCTION OF POROUS SHAPED INORGANIC STRUCTURES USING GAS-LADEN MOLECULAR SIEVE ZEOLITES

This invention relates to a process for producing inorganic porous compounds by adding molecular sieve zeolites to an aqueous suspension.

A wide variety of both organic and inorganic porous compounds is already known. The various types of foam rubber, polyurethane foams and polystyrene foams are examples of organic porous compounds. Porous ceramic stone, lightweight concrete, silicate foams and foamed gypsum are examples of inorganic porous systems.

Numerous processes are known for producing such porous substances. Porous ceramic stone, for example is produced by mixing the ceramic starting materials with combustible substances such as sawdust, coal, polystyrene or like materials and then pressing the resulting mixture into suitable molds. When the pressed molding is subsequently fired, the organic substances added to the mixture are burnt off, leaving the required pores behind.

In the case of lightweight concrete, an aqueous suspension of cement and sand is mixed with aluminum powder, which dissolves in the alkaline medium. The hydrogen liberated in the reaction produces the pores.

However, all the conventional processes for producing porous compounds and especially ceramic materials have substantial disadvantages which manifest themselves under various circumstances. Thus, in the case of aqueous suspensions which are too fluid for example, it is found that combustible substances which have been added to the suspension are washed out and therefore not only fail to have the desired effect but moreover result in a porous surface and brittle edges. Furthermore, in many cases these suspensions cannot be made sufficiently acid or alkaline to bring about the required evolution of gas, e.g. by dissolving aluminum powder. Suspensions of this kind are, for example, the slips or slurries used for producing ceramic, gypsum or gel products, which are formed by casting into suitable molds.

This invention relates to a process for producing inorganic porous compounds from aqueous suspensions, having the characteristic feature that the aqueous suspension is mixed with a gas-laden molecular sieve zeolite, which liberates gases under the action of water.

It has surprisingly been found that the abovementioned disadvantages of the conventional processes can be obviated by the process according to the invention, and products with a very uniform pore structure can be obtained in a simple manner. In its simplest form, the process according to the invention comprises mixing an aqueous suspension of inorganic solids with a molecular sieve zeolite, which under the action of water gives off the gas with which it is laden, and thereby forms the pore structure of the suspension.

By molecular sieve zeolites we mean crystalline alumino silicates, of which numerous naturally occurring and synthetic types are known. Particularly important molecular sieve zeolites are, for example, zeolite A, faujasite, mordenite, chabasite, erionite and clinoptilolite. The various types of zeolites mentioned here differ from each other in their crystal structure, which can be defined and demonstrated by their characteristic X-ray diffraction lines. Their chemical composition may vary within wide limits. The crystal lattice contains pores of uniform diameter depending on the type of zeolite and the nature of the cation.

The process according to the invention may in principle be carried out using any zeolites which have molecular-sieve properties. In addition to those mentioned above, therefore, any of the zeolites mentioned e.g. by D. E. Breck in "Advances in Chemistry Series" 101 (1971), 1–18 may be used for the process according to the invention.

The zeolites may be prepared in a conventional manner by heating systems which contain $Na_2O$—, $Al_2O_3$, $SiO_2$ and $H_2O$ for example mixtures of water glass and sodium aluminate solution (see e.g. German Patents Nos. 1,038,016 and 1,038,017 and German Auslegeschrift No. 1,095,795).

The sodium zeolite obtained in this way can be converted into any other metal form by a process of ion exchange by stirring the zeolite into a solution of the appropriate salts.

A zeolite with a pore size of 5 A, which is particularly suitable for the process according to the invention, is zeolite A which has been converted into the calcium form by ion exchange (see e.g. German Patent No. 1.038,017). Zeolite A is characterized by a composition within the range:

$$(1.0\pm0.2)M_{2/n}O.Al_2O_3. (1.85\pm0.2)SiO_2.(0.-6)H_2O$$

where M = a metal, e.g. Na, K, Ca, Ag, etc; and n = valency of the metal
and by the following Debye-Scherer X-ray lines (d-values in A): 12.2±0.2; 8.6±0.2; 7.05±0.15; 4.07±0.08; 3.68±0.07; 3.38±0.06; 3.26±0.05; 2.96±0.05; 2.73±0.05.

One particular feature of molecular-sieve zeolites is that they can be dehydrated, for example by heating them to temperatures of from about 300° to 400°C, without thereby destroying the crystal structure. If a zeolite which has been treated in this way is cooled to room temperature and a gas is then passed over it, the gas enters the cavities left by the water driven out of the lattice, and is held there. The molecules of the gas must, however, have a smaller diameter than the pores of the zeolite lattice and they must be polar or readily polarizable. Thus, for example, carbon dioxide, sulfur dioxide, ammonia, ethylene, acetylene, propylene, n-butene-1, n-butene-2, butadiene, difluoromonochloromethane and others may be absorbed in a 5A zeolite in quantities of more than 10% by weight.

If a gas-laden zeolite is stirred into the aqueous slurry used for producing ceramics, gypsum or gel materials, for example in quantities of from about 0.5 to 10% by weight and preferably 1–5% by weight of the total solids, the water in the slurry acts on the zeolite to liberate the gas. Very fine bubbles are formed, some of which unite to form larger bubbles while others escape, although for the most part they remain in the slurry both during and after the process of pouring the slurry into the casting molds. This formation of bubbles may as much as double the volume of the slurry. The increase in volume is maintained even after drying or hardening and in the case of ceramic compounds even after firing. The specific gravity is reduced correspondingly to about half.

The increase in volume of the slurry or reduction in specific gravity achieved depends on the nature of the gas used in the zeolite and the quantity decomposed. Thus, for example, $CO_2$, $SO_2$ or $NH_3$ are less suitable than, for example, hydrocarbons such as ethylene, propylene, butylene, or acetylene, on account of their solubility in water.

n-butene-1 has been found to be particularly advantageous.

The process according to the invention may be applied for various purposes. Thus, for example, it may be used for producing large format ceramic panels with a low absolute weight or for producing shaped products by foaming in a core mold instead of by the hollow casting process. The process may also be used for gypsum, cement, oxidic gels and inorganic compounds with organic additives.

The process according to the invention will now be described in more detail with the aid of the following Examples.

EXAMPLE 1 a. Preparation of sodium zeolite A (according to German Auslegeschrift No. 1,095,795):

35 liters of a 2-molar $3.0\ Na_2O.Al_2O_3$ solution are diluted with 42.5 liters of water and heated to 60°C. 22.5 liters of a 1.65 molar $Na_2O.3.4SiO_2$ solution are then added to the aforesaid solution with gentle stirring. The mixture, which has a composition of 0.7 m $Na_2O.Al_2O_3.1.8SiO_2$ and 3.55 m NaOH, is heated to 60°C with continued stirring for 5 hours. The finely crystalline sodium zeolite A formed in this way (crystal size: 1 to 5 $\mu$m) is filtered off, washed and dried.

b. Preparation of calcium zeolite A (5A zeolite):

200 kg of sodium zeolite A are suspended in a solution of 200 kg of calcium chloride. The suspension is heated to 80°C with stirring and is kept at this temperature for 5 hours. The finely crystalline calcium zeolite A formed in this way is filtered off, washed and freed from water by heating to 400°C.

c. Charging calcium zeolite A with n-butene-1:

100 g of anhydrous calcium zeolite A are introduced into a vertical glass tube which has an internal diameter of 3 cm and which has a gas-permeable filter plate at the bottom. n-butene-1 is introduced through the filter plate from a steel flask. The progressive charging of the zeolite with gas is observable by a zone of heat moving upwards from the bottom. Charging is complete when the zeolite powder at the top end of the tube has returned to room temperature. The zeolite has adsorbed 11 g of n-butene-1 per 100 g.

d. Preparation of a foamed ceramic panel:

460 g of kaolin,
100 g of feldspar,
270 g of earthenware clay
70 g of chalk and
100 g of bisque (pot shards)

are ground up with 320 ml of water in a ball mill to form 1320 g of slurry.

7.5 g of powdered calcium zeolite A laden with n-butene-1 are stirred into 500 g of this slurry in a stirrer vessel.

The foamed slurry is poured into a gypsum mold. After 3 hours, the blank is removed from the mold, dried at 110°C for 24 hours and fired at 1150°C for 1 hour.

The specific gravity of the resulting ceramic panel, which is determined according to DIN 51056 and DIN 51065 from the ratio of the weight of the panel to the volume after it has been steeped in water, is found to be 0.85 g/ml. A panel produced without the addition of zeolite was found to have a specific gravity of 1.7 g/ml. The ceramic panel is smooth, flat and without cracks and can be glazed.

EXAMPLE 2

Manufacture of a foamed gypsum body:

100 g of anhydrite are stirred up with 30 g of water to form a pasty mixture. 5 g of a 5 A zeolite laden with n-butene-1 prepared as described in Example 1 are then added and homogeneously mixed. The mixture is cast into a cylindrical mold and left to solidify. The specific gravity of the foamed gypsum is determined according to DIN 51056 and DIN 52065 and found to be 0.95 g/ml. The density of a gypsum body which had not been foamed was found to be 1.6 g/ml.

EXAMPLE 3

Manufacture of a foamed cement body:

50 g of commercial cement,
100 g of quartz sand and
33 ml of water are mixed together. 5.5 g of a butadiene-laden calcium zeolite prepared as described in Example 1 are added to this mixture. When the mixture has solidified, the specific gravity of the body is determined according to DIN 51056 and DIN 51065 and found to be 1.27 g/ml. The specific gravity of a cement body which had not been foamed was found to be 1.93 g/ml.

It will be appreciated that the instant specification and examples are set forth by way of illustration and not limitation, and that various modifications and changes may be made without departing from the spirit and scope of the present invention.

What is claimed is:

1. In the production of a porous shaped inorganic structure where an aqueous suspension of inorganic solids in a liquid is mixed with a gas-generating compound and the suspension is poured into a mold, the improvement which comprises employing as said gas-generating compound about 0.5 to 10% by weight of the total solids of a molecular sieve zeolite laden with a gas, whereby said zeolite under the action of the water gives off the gas with which it is laden and thereby forms the pores of the structure.

2. The process according to claim 1, wherein the molecular sieve zeolite has a pore size of about 5 A.

3. The process according to claim 1, wherein the molecular sieve zeolite is laden with at least one gas selected from the group consisting of ethylene, propylene, n-butene-1, n-butene-2—, butadiene and acetylene.

4. The process according to claim 3, wherein the molecular sieve zeolite has a pore size of about 5 A and is added to the suspension in about 1 to 5% by weight of the total solids.

* * * * *